(12) United States Patent
Hein et al.

(10) Patent No.: US 7,166,144 B2
(45) Date of Patent: Jan. 23, 2007

(54) INTERLACED SERIES PARALLEL CONFIGURATION FOR METAL SOLVENT EXTRACTION PLANTS

(75) Inventors: Hans C. Hein, Santiago (CL); Gabriel Araya, Antofagasto (CL)

(73) Assignee: Cognis Corporation, Cincinnati, OH (US)

( * ) Notice: Subject to any disclaimer, the term of this patent is extended or adjusted under 35 U.S.C. 154(b) by 0 days.

(21) Appl. No.: 10/839,196

(22) Filed: May 5, 2004

(65) Prior Publication Data

US 2004/0261579 A1    Dec. 30, 2004

Related U.S. Application Data

(63) Continuation-in-part of application No. 10/816,360, filed on Apr. 1, 2004, now abandoned.

(60) Provisional application No. 60/463,243, filed on Apr. 16, 2003.

(51) Int. Cl.
*C21B 15/00* (2006.01)
(52) U.S. Cl. .......................... 75/722; 75/743; 205/291
(58) Field of Classification Search ................ 75/722, 75/743; 423/24; 205/291
See application file for complete search history.

(56) References Cited

U.S. PATENT DOCUMENTS 6,177,055 B1    1/2001    Virnig et al.
6,231,784 B1    5/2001    Virnig et al.
6,242,625 B1 *  6/2001    Kordosky .................. 556/110
6,395,062 B1    5/2002    Olafson et al.
6,632,264 B1    10/2003   Zhang et al.

FOREIGN PATENT DOCUMENTS

WO    WO 02/092863    11/1992

\* cited by examiner

*Primary Examiner*—Scott Kastler
(74) *Attorney, Agent, or Firm*—John F. Daniels; Arthur G. Seifert (57) ABSTRACT

An interlaced series parallel configuration for the extraction of metal values from an metal value containing aqueous is a special series parallel configuration wherein the stripped organic is first contacted in a second extraction stage with the partially copper depleted aqueous stream exiting from a first extraction stage. This partially loaded organic then advances to a parallel extraction stage where it is contacted with a fresh volume of PLS and extracts additional copper. The organic then advances to the first extraction stage where it contacts a second stream of PLS. This approach results in an overall higher recovery of copper than in the conventional modified series parallel configuration. An increase of 4% overall recovery of copper is achieved relative to that realized with the conventional series parallel configuration.

49 Claims, 6 Drawing Sheets

INTERLACED SERIES PARALLEL CONFIGURATION FOR METAL SOLVENT EXTRACTION PLANTS

CROSS-REFERENCE TO RELATED APPLICATIONS

This application is a continuation-in-part of application Ser. No. 10/816,360 filed on Apr. 1, 2004 now abandoned, the entire contents of which are incorporated herein by reference, which application claims the benefit of provisional application Ser. No. 60/463,243, filed on Apr. 16, 2003.

BACKGROUND OF THE INVENTION

Various metals can be recovered from their ores by leaching. Leaching is accomplished by contacting ore-containing rock with an aqueous acidic solution. A metal of choice can be obtained from a body of ore which contains a mixture of metals in addition to the desired metal. The leaching medium dissolves salts of the desired metal and other metals as it trickles through the ore, to provide an aqueous solution of the mixture of metal values. The metal values are usually leached with a sulfuric acid medium, providing an acidic aqueous solution, but can also be leached by ammonia to provide a basic aqueous solution.

The aqueous leaching solution is mixed in tanks with an extraction reagent which is dissolved in an organic solvent, e.g., a kerosene. The reagent includes an extractant chemical which forms a metal-extractant complex with the desired metal ions in preference to ions of other metals. The step of forming the complex is called the extraction or loading stage of the solvent extraction process. The nature of the extractant depends upon the metal to be extracted and the nature of the leach solution. For example, zinc can be extracted with di-2-ethylhexylphosphoric acid, uranium using a tertiary fatty amine reagent such as ALAMINE® tertiary amine, cobalt as the chloride complex using a tertiary fatty amine reagent such as ALAMINE® tertiary amine, cobalt using an organo phosphonic acid or phosphinic acid, nickel using a carboxylic acid, molybdenum using a tertiary fatty amine reagent such as ALAMINE® tertiary amine. Copper can be extracted with an aldoxime such as 2-hydroxy-5-nonyl benzaldoxime, a ketoxime such as a 2-hydroxy-5-alkylphenyl ketoxime or combinations of aldoximes and ketoximes such as is described in U.S. Pat. No. 6,395,062, the entire contents of which are incorporated herein by reference and oximes in combinations with extractant and equilibrium modifiers such as is described in U.S. Pat. Nos. 6,231,784 and 6,177,055, the entire contents of each of which are incorporated herein by reference.

New and more economical methods of improving the extraction process are continuously being sought in order to lower costs and improve the quality of the metal produced.

BRIEF SUMMARY OF THE INVENTION

The present invention is an interlaced series parallel configuration for metal solvent extraction plants. The method is comprised of the steps of: (1) contacting an organic phase comprised of a water insoluble and water immiscible solvent solution of an extraction reagent formulation substantially free of metal values with a first aqueous metal bearing solution to extract at least a portion of the metal into the organic phase to form a metal depleted aqueous raffinate solution and a first partially loaded organic phase wherein the first aqueous metal bearing solution is the raffinate from step (3) (Extraction in E2 as shown on FIG. 2); (2) contacting the first partially loaded organic phase with a second aqueous metal bearing solution to form a metal depleted aqueous raffinate solution and a second partially loaded organic phase having a metal content greater than the first partially loaded organic phase (Extraction in EP as shown on FIG. 2); (3) contacting the second partially loaded organic phase with a third aqueous metal bearing solution to form a partially metal depleted aqueous and a third partially loaded organic phase (Extraction in E1 as shown on FIG. 2).

One modification of the process according to the invention is a triple interlaced series parallel configuration for metal solvent extraction plants. This method is comprised of the steps of: (1) contacting an organic phase comprised of a water insoluble and water immiscible solvent solution of an extraction reagent formulation substantially free of metal values with a first aqueous metal bearing solution to extract at least a portion of the metal into the organic phase to form a metal depleted aqueous raffinate solution and a first partially loaded organic phase wherein the first aqueous metal bearing solution is the raffinate from step (4) (Extraction in E4 of FIG. 4); (2) contacting the first partially loaded organic phase with a second aqueous metal bearing solution to form a metal depleted aqueous raffinate solution and a second partially loaded organic phase having a metal content greater than the first partially loaded organic phase (Extraction in E3 of FIG. 4); (3) contacting the second partially loaded organic phase with a third aqueous metal bearing solution to form a metal depleted aqueous raffinate solution and a third partially loaded organic phase having a metal content greater than the second partially loaded organic phase (Extraction in E2 of FIG. 4); (4) contacting the third partially loaded organic phase with a fourth aqueous metal bearing solution to form a partially metal depleted aqueous and a fourth partially loaded organic phase (Extraction in E1 of FIG. 4).

Another modification of the process according to the invention is a nested configuration. This method is comprised of the steps of: (1) contacting an organic phase comprised of a water insoluble and water immiscible solvent solution of an extraction reagent formulation substantially free of metal values with a first aqueous metal bearing solution to extract at least a portion of the metal into the organic phase to form a metal depleted aqueous raffinate solution and a first partially loaded organic phase wherein the first aqueous metal bearing solution is the raffinate from step (4) (Extraction in E4 of FIG. 6); (2) contacting the first partially loaded organic phase with a second aqueous metal bearing solution to form a metal depleted aqueous raffinate solution and a second partially loaded organic phase having a metal content greater than the first partially loaded organic phase wherein the first aqueous metal bearing solution is the raffinate from step (3) (Extraction in E3 of FIG. 6); (3) contacting the second partially loaded organic phase with a third aqueous metal bearing solution to form a partially metal depleted aqueous and a third partially loaded organic phase having a metal content greater than the first partially loaded organic phase (Extraction in E2 of FIG. 6); (4) contacting the third partially loaded organic phase with a fourth aqueous metal bearing solution to form a partially metal depleted aqueous and a fourth loaded organic phase (Extraction in E1 of FIG. 6).

DETAILED DESCRIPTION OF THE INVENTION

The process according to the invention can be best understood with reference to the figures. While the process according to the invention can be used in the extraction of any metal including, but not limited to, zinc, uranium, cobalt, nickel, and molybdenum, it will be described with reference to copper, the preferred embodiment.

As used herein the abbreviation PLS stands for a copper-rich aqueous leaching solution. The term "partially loaded organic phase" is an organic phase comprised of a water insoluble and water immiscible solvent solution of an extraction reagent formulation containing less than the maximum possible amount of metal values. The term "loaded organic phase" is an organic phase comprised of a water insoluble and water immiscible solvent solution of an extraction reagent formulation containing the maximum possible amount of metal values. The extractant reagent is defined above and, in the case of copper extraction, can include equilibrium modifiers which can be diesters of linear dicarboxylic acids such as linear alcohol esters of malonic, adipic, terephthalic acids. The term "stripped organic phase" is an organic phase comprised of a water insoluble and water immiscible solvent solution of an extraction reagent formulation substantially free of copper values. A stripped organic phase is one in which copper values have been removed from a loaded or partially organic phase by contacting the loaded or partially organic phase with aqueous acid thereby transferring substantially all of the copper value from the organic phase to the aqueous phase (which stripping would take place, for example, in stripping stages "S, S1" and/or "S2" as shown in the drawings) or it can be fresh, unused organic phase. A raffinate is an aqueous solution which exits an extraction stage and has been at least partially depleted of copper values by an organic phase.

Figure 1:
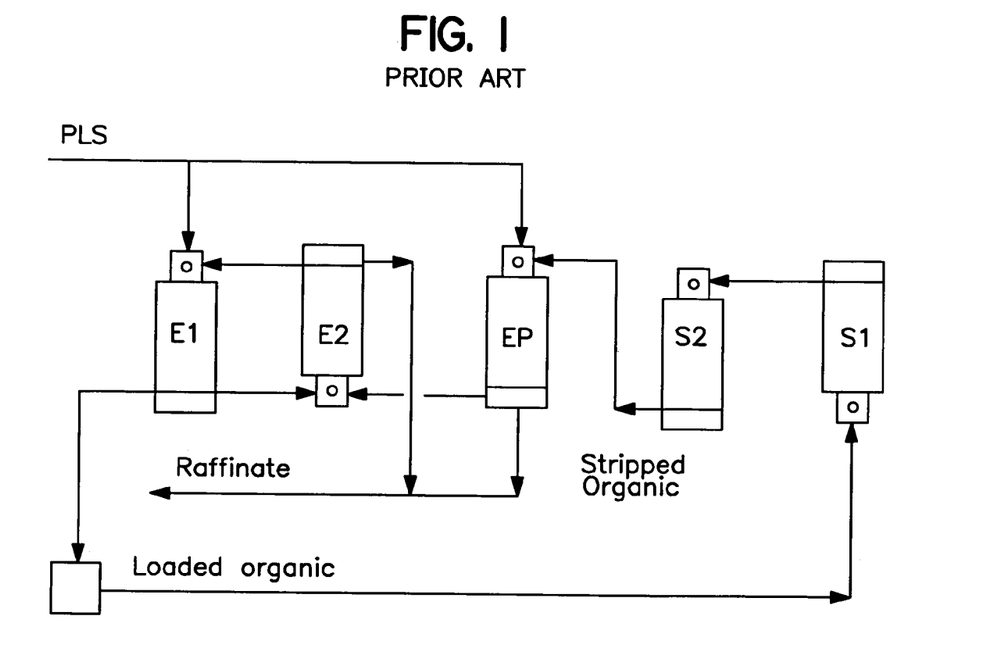
FIG. 1 is a flow diagram of a conventional series parallel extraction configuration.

FIG. 1 depicts a flow diagram for a conventional series parallel extraction line where there is a fixed configuration and the extraction stages are in one row. The PLS is fed to two parallel-connected extraction stages, E1 and EP. The PLS is extracted in EP by stripped organic and the partially loaded organic is sent to E2 wherein it extracts the raffinate from E1. In E1, the PLS is extracted and the aqueous from E1 is fed in series to E2 where it is extracted by the partially loaded organic from EP. The organic from E2 is fed to E1 where it extracts the PLS. The loaded organic from E1 is sent to stripping. The PLS is extracted by copper-free organic in EP and by partially loaded organic in E1.

Figure 2:
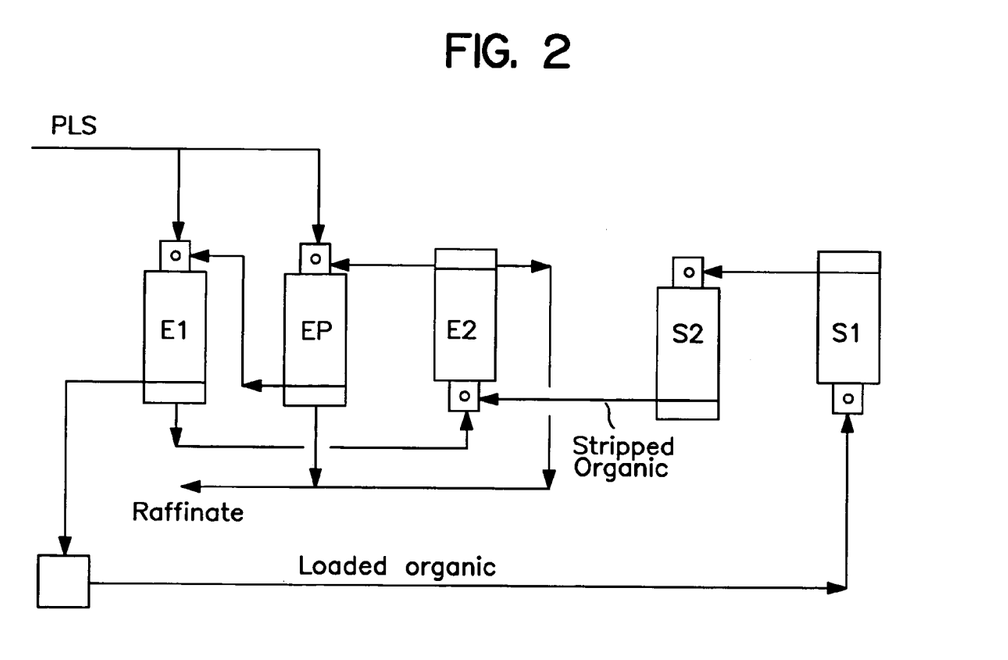
FIG. 2 is a flow diagram of an interlaced series parallel extraction configuration.

FIG. 2 depicts a flow diagram of an interlaced series parallel extraction line where E2 and EP are juxtaposed. As in the conventional series parallel extraction line, the PLS is fed to two parallel-connected extraction stages, E1 and EP. In this configuration, the stripped organic is first contacted in E2 by the partially copper depleted aqueous from E1. This partially loaded organic then advances to the EP stage where it is contacted with a fresh volume of PLS and extracts additional copper. The organic phase then advances to E1 where it contacts a second stream of fresh PLS to form a fully loaded organic phase. The copper can be recovered from the fully loaded organic by stripping with aqueous acid. The strip aqueous solution resulting from the stripping contains substantially only copper. The pure copper metal can be recovered from the metal loaded stripping solution by electrowinning. This approach results in an overall higher recovery of copper than in the conventional series parallel configuration. This results primarily from the fact that the stripped organic which is a more efficient organic in terms of copper extraction contacts the partially copper depleted aqueous stream coming from E1. In a conventional circuit, this stripped organic first passes through the EP stage before entering E2 and extracts a significant amount of copper. It is not as efficient as a stripped organic in terms of achieving a low raffinate in the exiting aqueous raffinate stream.

The interlaced series parallel extraction configuration will typically achieve overall recoveries of from about 0.2 to about 5% absolute higher than a conventional series parallel configuration. For a 50,000 metric ton per year plant, a 1% improvement in recovery is equivalent to approximately $1,500,000 in additional revenue at contemporary copper prices.

Figure 3:
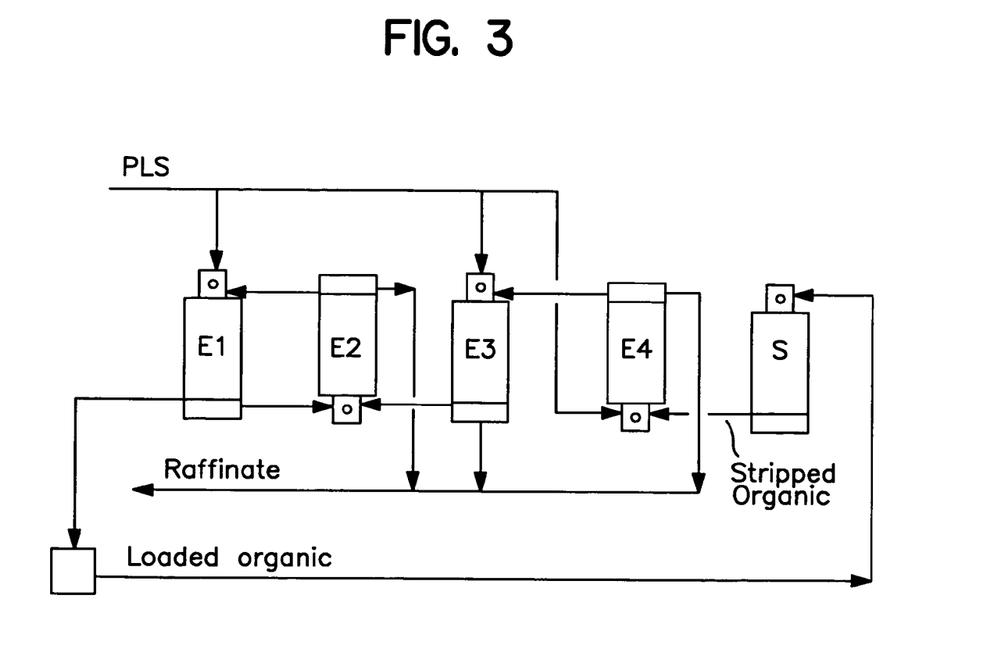
FIG. 3 is a flow diagram of a conventional series triple parallel extraction configuration.

FIG. 3 depicts a variation of the conventional series parallel extraction method which is a flow diagram of an series triple parallel extraction configuration having four extraction stages as opposed to three extraction stages depicted in FIG. 1. In the series triple parallel extraction configuration, the stripped organic is first contacted in E4 by fresh PLS to form a first partially loaded organic and raffinate which is cycled back to the leaching operation. The first partially loaded organic from E4 is then contacted by fresh PLS in E3 to form a second partially loaded organic having a metal value greater than the first partially loaded organic and raffinate which is cycled back to the leaching operation. The second partially loaded organic from E3 is fed to E2 where it is contacted by raffinate from E1 which is formed by extraction of PLS by the third partially loaded organic from E2. The raffinate from the E2 extraction is cycled back to the leaching operation.

Figure 4:
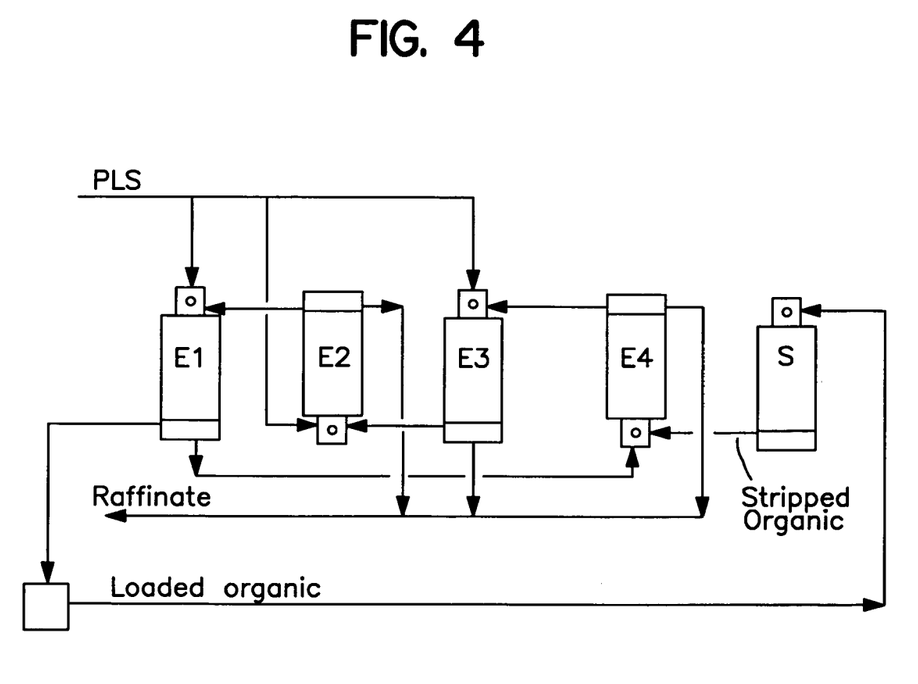
FIG. 4 is a flow diagram of an optimized interlaced series parallel special triple extraction configuration.

FIG. 4 depicts a variation of the optimized triple series parallel method which is a flow diagram of an optimized triple series parallel extraction configuration having four extraction stages as opposed to three extraction stages in FIG. 2. In the optimized triple series parallel extraction configuration, the stripped organic is first contacted in E4 by the partially copper depleted aqueous from E1. This partially loaded organic then advances to the E3 stage where it is contacted with a fresh volume of PLS and extracts additional copper. The organic phase then advances to E2 where it contacts a second stream of fresh PLS and extracts additional copper. The organic phase then advances to E1 where it contacts a second stream of fresh PLS to form a fully loaded organic phase.

Figure 5:
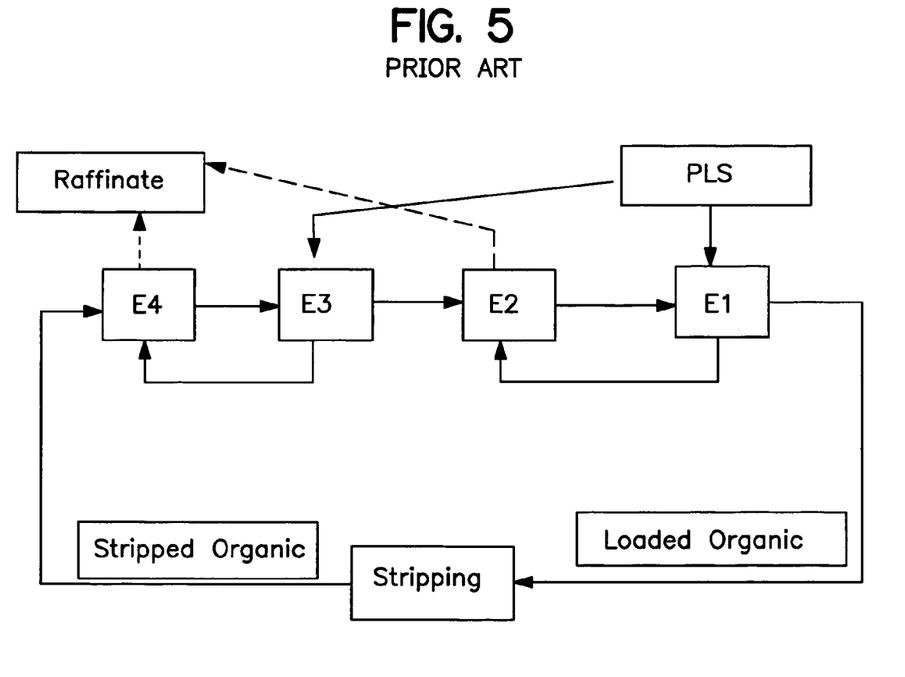
FIG. 5 is a flow diagram of an embodiment of a conventional parallel series extraction configuration.

FIG. 5 is an alternate depiction of a flow diagram for a conventional parallel series extraction line where there is a fixed configuration and the extraction stages are in one row. The stripped organic is fed to E4 wherein it contacts the intermediate raffinate from E3. The partially loaded organic from E4 is advanced to E3 where it contacts a volume of PLS and extracts additional copper while generating an intermediate raffinate which advances to E4. The partially loaded organic from E3 than advances to E2 where it contacts the intermediate raffinate from E1 and extracts additional copper. The partially loaded organic from E2 than advances to E1 where it contacts a fresh volume of PLS generating a loaded organic and an intermediate raffinate which advances to E2. The loaded organic from E1 is sent to stripping.

Figure 6:
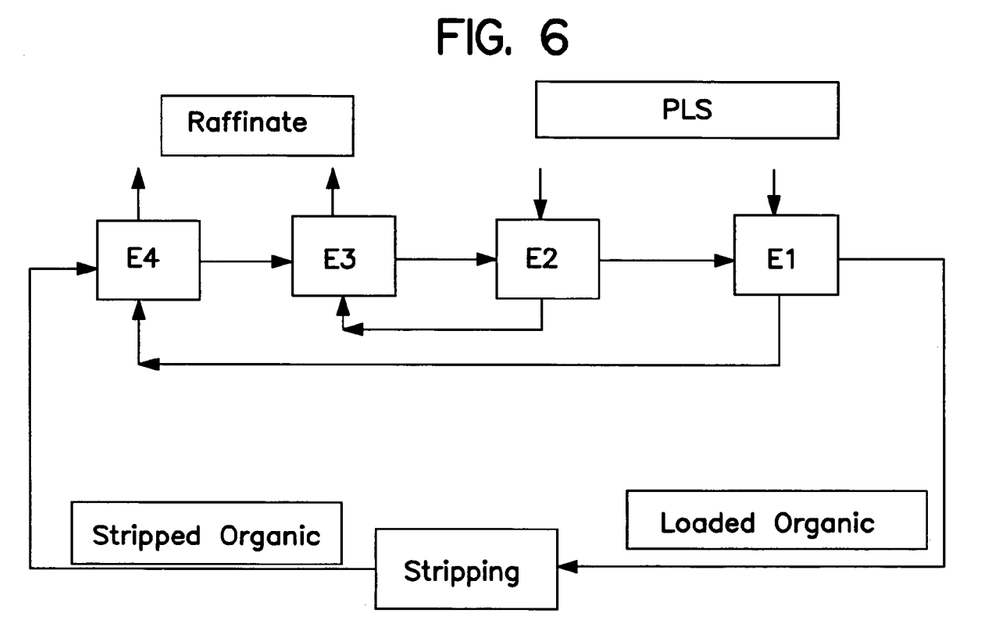
FIG. 6 is a flow diagram of a nested parallel series extraction configuration.

FIG. 6 depicts a flow diagram of an optimized parallel series extraction line also referred to as a nested series configuration. In this configuration, the E3 and E4 stages of the conventional parallel series circuit are inserted between the E2 and E1 stages of the conventional parallel series circuit. In this configuration, the stripped organic is first contacted in E4 by the partially copper depleted intermediate raffinate from E1. This partially loaded organic then advances to the E3 stage where it is contacted with the partially copper depleted raffinate from E2. The partially loaded organic phase then advances to E2 where it contacts a stream of fresh PLS to form a third partially loaded organic phase and generates an intermediate raffinate which is fed to E3. The organic than advances to E1 where it contacts a second volume of fresh PLS to form a fully loaded organic and an intermediate raffinate which is advanced to E4. The copper can be recovered from the fully loaded organic by stripping with aqueous acid. The strip aqueous solution resulting from the stripping contains substantially only copper. The pure copper metal can be recovered from the metal loaded stripping solution by electrowinning. This approach results in an overall higher recovery of copper than in the conventional parallel series configuration. This results primarily from the fact that the stripped organic which is a more efficient organic in terms of copper extraction contacts the partially copper depleted aqueous streams coming from E1 and E2 first. In a conventional circuit, this stripped organic first passes through the E4 and E3 stages before entering E2 and extracts a significant amount of not as efficient as a stripped organic in terms of achieving a low raffinate in the exiting aqueous raffinate stream from E2 in the conventional parallel series configuration.

The following examples are meant to illustrate but not to limit the invention.

EXAMPLE 1

For comparison purposes, a trial was carried out at a copper solvent extraction plant operating with a conventional series-parallel configuration (FIG. 1). The plant was carefully monitored for a period of time and then the circuit was re-piped to operate with the interlaced series parallel configuration (FIG. 2). The operating conditions and overall copper recovery data for each circuit configuration are summarized in the following Tables:

| EXTRACTION DATA FOR INTERLACED SERIES PARALLEL CONFIGURATION (FIG. 2) | |
|---|---|
| PLS | 3.74 g/l Cu, pH 2.05 |
| Total PLS flow | 320 m³/h |
| PLS flow to E1 (series) | 180 m³/h |
| PLS flow to EP (parallel) | 140 m³/h |
| Organic flow (whole circuit) | 180 m³/h |
| Reagent concentration | 18.4% (v/v) |
| E1 semi-raffinate | 1.10 g/l Cu |
| EP raffinate (parallel) | 0.23 g/l Cu |

-continued

| EXTRACTION DATA FOR INTERLACED SERIES PARALLEL CONFIGURATION (FIG. 2) | |
|---|---|
| E2 raffinate (series) | 0.09 g/l Cu |
| Overall O/A Extraction | 1/1 |
| O/A E1 stage (aq. recycle) | 0.85/1 |
| Spent electrolyte | 31.1 g/l Cu, 175.0 g/l H2SO4 |
| Pregnant electrolyte | 44.4 g/l Cu |
| Series recovery | 97.6% |
| Parallel recovery | 93.8% |
| Combined recovery | 95.9% |
| Net copper transfer | 0.347 g/l Cu/volume % extractant |

COMPARATIVE EXAMPLE

| EXTRACTION DATA FOR CONVENTIONAL SERIES PARALLEL CONFIGURATION (FIG. 1) | |
|---|---|
| PLS | 3.74 g/l Cu, pH 2.12 |
| Total PLS flow | 320 m³/h |
| PLS flow to E1 (series) | 140 m³/h |
| PLS flow to EP (parallel) | 180 m³/h |
| Organic flow (whole circuit) | 180 m³/h |
| Reagent concentration | 18.4% (v/v) |
| E1 semi-raffinate | 1.30 g/l Cu |
| E2 raffinate (series) | 0.32 g/l Cu |
| EP raffinate (parallel) | 0.29 g/l Cu |
| Overall O/A Extraction | 1/1 |
| O/A E1 stage (aq. recycle) | 0.85/1 |
| Spent electrolyte | 30.0 g/l Cu, 180.3 g/l H2SO4 |
| Pregnant electrolyte | 43.5 g/l Cu |
| Series recovery | 91.4% |
| Parallel recovery | 92.2% |
| Combined recovery | 91.9% |
| Net copper transfer | 0.332 g/l Cu/volume % extractant |

The plant organic was used in both cases. The majority of the extractant present in the organic was LIX®984N, a trademark product of Cognis Corporation, Cincinnati, Ohio.

While operating in the interlaced series parallel configuration, an additional 4% overall recovery of copper was achieved as compared to operating with the conventional series parallel configuration.

What is claimed is:

1. A method for extracting and recovering a metal from an aqueous solution containing the metal in an extraction circuit comprising of the steps of:
    (1) feeding a first metal-rich aqueous leaching solution into a first extraction stage and a second metal-rich aqueous leaching solution into a parallel connected extraction stage,
    (2) in a second extraction stage, serially connected to the first extraction stage, contacting an organic phase comprised of a water insoluble and water immiscible solvent solution of an extraction reagent formulation substantially free of metal values with a first aqueous metal bearing solution from the first extraction stage to extract at least a portion of the metal into the organic phase to form a metal depleted aqueous raffinate solution and a first partially loaded organic phase;
    (3) in the parallel extraction stage, contacting the first partially loaded organic phase with the second aqueous metal-rich leaching solution to form a metal depleted aqueous raffinate solution and a second partially loaded organic phase having a metal content greater than the first partially loaded organic phase; and (4) in the first extraction stage, contacting the second partially loaded organic phase with the first aqueous metal-rich aqueous leaching solution to form the first aqueous metal bearing solution and a fully loaded organic phase, wherein the metal is continuously recovered by stripping from the fully loaded organic phase.

2. The method of claim 1 wherein the extraction reagent is a mixture comprised of an aldoxime and a ketoxime.

3. The method of claim 2 wherein the mixture is further comprised of an equilibrium modifier.

4. The method of claim 1 wherein the extraction reagent is an aldoxime.

5. The method of claim 1 wherein the extraction reagent is a ketoxime.

6. The method of claim 1 wherein the metal is zinc.

7. The method of claim 1 wherein the metal is uranium.

8. The method of claim 1 wherein the metal is cobalt.

9. The method of claim 1 wherein the metal is molybdenum.

10. The method of claim 1 wherein the metal is nickel.

11. The method of claim 1 wherein the metal is copper.

12. The method of claim 6 wherein the extraction reagent is di-2-ethylhexylphosphoric acid.

13. The method of claim 7 wherein the extraction reagent is a tertiary fatty amine.

14. The method of claim 8 wherein the extraction reagent is a tertiary fatty amine.

15. The method of claim 9 wherein the extraction reagent is a tertiary fatty amine.

16. The method of claim 10 wherein the extraction reagent is an organo phosphonic acid or phosphinic acid or a carboxylic acid.

17. The method of claim 11 wherein the extraction reagent is an aldoxime, a ketoxime or a combination thereof.

18. A method for extracting and recovering copper from an aqueous solution containing copper in an extraction circuit comprising of the steps of:

(1) feeding a first copper-rich aqueous leaching solution into a first extraction stage and a second copper-rich aqueous leaching solution into a parallel connected extraction stage, (2) in a second extraction stage, serially connected to the first extraction stage, contacting an organic phase comprised of a water insoluble and water immiscible solvent solution of an extraction reagent formulation substantially free of copper values with a first aqueous copper bearing solution from the first extraction stage to extract at least a portion of the copper into the organic phase to form a copper depleted aqueous raffinate solution and a first partially loaded organic phase;

(3) in the parallel extraction stage, contacting the first partially loaded organic phase with the second aqueous leaching solution to form a copper depleted aqueous raffinate solution and a second partially loaded organic phase having a copper content greater than the first partially loaded organic phase; and (4) in the first extraction stage, contacting the second partially loaded organic phase with the first aqueous copper-rich aqueous leaching solution to form the first aqueous copper bearing solution and a fully loaded organic phase, wherein the copper is continuously recovered by stripping from the fully loaded organic phase.

19. The method of claim 18 wherein the extraction reagent is an aldoxime, a ketoxime or a combination thereof.

20. The method of claim 19 wherein the mixture is further comprised of an equilibrium modifier.

21. The method of claim 18 further comprising the step of recovering the copper by contacting the fully loaded organic phase with an aqueous acid solution wherein the copper is transferred to the aqueous acid solution to form a strip aqueous phase.

22. The method of claim 21 further comprising the step of recovering the copper from the strip aqueous phase by electrowinning.

23. A method for extracting and recovering a metal from an aqueous solution containing the metal in an extraction circuit comprising of the steps of:

(1) feeding a first metal-rich aqueous leaching solution into a first extraction stage and a second metal-rich aqueous leaching solution into a second extraction stage and a third metal-rich aqueous leaching solution into a third extraction stage;

(2) in a fourth extraction stage, contacting an organic phase comprised of a water insoluble and water immiscible solvent solution of an extraction reagent formulation substantially free of metal values with a partially metal depleted aqueous solution from the first extraction stage to extract at least a portion of the metal into the organic phase to form a metal depleted aqueous raffinate solution and a first partially loaded organic phase;

(3) in the third extraction stage, contacting the first partially loaded organic phase with the third metal-rich aqueous leaching solution to form a metal depleted aqueous raffinate solution and a second partially loaded organic phase having a metal content greater than the first partially loaded organic phase;

(4) in the second extraction stage, contacting the second partially loaded organic phase with the second metal-rich aqueous leaching solution to form a metal depleted aqueous raffinate solution and a third partially loaded organic phase having a metal content greater than the second partially loaded organic phase; and (5) in the first extraction stage, contacting the third partially loaded organic phase with the first metal-rich aqueous leaching solution to form the partially metal depleted aqueous raffinate solution and a fully loaded organic phase, wherein the metal is continuously recovered by stripping from the fully loaded organic phase.

24. The method of claim 23 wherein the extraction reagent is a mixture comprised of an aldoxime and a ketoxime.

25. The method of claim 24 wherein the mixture is further comprised of an equilibrium modifier.

26. The method of claim 23 wherein the extraction reagent is an aldoxime.

27. The method of claim 23 wherein the extraction reagent is a ketoxime.

28. The method of claim 23 wherein the metal is zinc.

29. The method of claim 23 wherein the metal is uranium.

30. The method of claim 23 wherein the metal is cobalt.

31. The method of claim 23 wherein the metal is molybdenum.

32. The method of claim 23 wherein the metal is nickel.

33. The method of claim 23 wherein the metal is copper.

34. The method of claim 28 wherein the extraction reagent is di-2-ethylhexylphosphoric acid.

35. The method of claim 29 wherein the extraction reagent is a tertiary fatty amine.

36. The method of claim 30 wherein the extraction reagent is a tertiary fatty amine.

37. The method of claim 31 wherein the extraction reagent is a tertiary fatty amine.

38. The method of claim 32 wherein the extraction reagent is an organo phosphonic acid or phosphinic acid or a carboxylic acid.

39. The method of claim 33 wherein the extraction reagent is an aldoxime, a ketoxime or a combination thereof.

40. A method for extracting and recovering copper from an aqueous solution containing the copper in an extraction circuit comprising of the steps of:
  (1) feeding a first copper-rich aqueous leaching solution into a first extraction stage and a second copper-rich aqueous leaching solution into a second extraction stage and a third copper-rich aqueous leaching solution into a third extraction stage;
  (2) in a fourth extraction stage, contacting an organic phase comprised of a water insoluble and water immiscible solvent solution of an extraction reagent formulation substantially free of copper values with a partially copper depleted aqueous solution from the first extraction stage to extract at least a portion of the copper into the organic phase to form a copper depleted aqueous raffinate solution and a first partially loaded organic phase;
  (3) in the third extraction stage, contacting the first partially loaded organic phase with the third copper-rich aqueous leaching solution to form a copper depleted aqueous raffinate solution and a second partially loaded organic phase having a copper content greater than the first partially loaded organic phase;
  (4) in the second extraction stage, contacting the second partially loaded organic phase with the second copper-rich aqueous leaching solution to form a copper depleted aqueous raffinate solution and a third partially loaded organic phase having a copper content greater than the second partially loaded organic phase; and
  (5) in the first extraction stage, contacting the third partially loaded organic phase with the first copper-rich aqueous leaching solution to form the partially copper depleted aqueous raffinate solution and a fully loaded organic phase, wherein the copper is continuously recovered by stripping from the fully loaded organic phase.

41. The method of claim 40 wherein the extraction reagent is an aldoxime, a ketoxime or a combination thereof.

42. The method of claim 41 wherein the mixture is further comprised of an equilibrium modifier.

43. The method of claim 40 further comprising the step of recovering the copper by contacting the fully loaded organic phase with an aqueous acid solution wherein the copper is transferred to the aqueous acid solution to form a strip aqueous phase.

44. The method of claim 43 further comprising the step of recovering the copper from the strip aqueous phase by electrowinning.

45. A method for extracting and recovering copper from an aqueous solution containing the copper in an extraction circuit comprising of the steps of:
  (1) feeding a first metal-rich aqueous leaching solution into a first extraction stage and a second metal-rich aqueous leaching solution into a second extraction stage;
  (2) in a fourth extraction stage, contacting an organic phase comprised of a water insoluble and water immiscible solvent solution of an extraction reagent formulation substantially free of metal values with a first aqueous metal bearing solution from the first extraction stage to extract at least a portion of the metal into the organic phase to form a metal depleted aqueous raffinate solution and a first partially loaded organic phase;
  (3) in a third extraction stage, contacting the first partially loaded organic phase with a second aqueous metal bearing solution from the second extraction stage to form a metal depleted aqueous raffinate solution and a second partially loaded organic phase having a metal content greater than the first partially loaded organic phase;
  (4) in the second extraction stage, contacting the second partially loaded organic phase with the second metal-rich aqueous leaching solution to form a partially metal depleted aqueous raffinate solution and a third partially loaded organic phase having a metal content greater than the first partially loaded organic phase; and
  (5) in the first extraction stage, contacting the third partially loaded organic phase with the first metal-rich aqueous leaching solution to form a partially metal depleted aqueous and a fully loaded organic phase, wherein the metal is continuously recovered by stripping from the fully loaded organic phase.

46. The method of claim 45 wherein the extraction reagent is an aldoxime, a ketoxime or a combination thereof.

47. The method of claim 45 wherein the mixture is further comprised of an equilibrium modifier.

48. The method of claim 45 further comprising the step of recovering the copper by contacting the fully loaded organic phase with an aqueous acid solution wherein the copper is transferred to the aqueous acid solution to form a strip aqueous phase.

49. The method of claim 48 further comprising the step of recovering the copper from the strip aqueous phase by electrowinning.

* * * * *